US009326340B2

(12) United States Patent
Arulandu et al.

(10) Patent No.: US 9,326,340 B2
(45) Date of Patent: Apr. 26, 2016

(54) CIRCUIT ARRANGEMENT FOR CONTROLLING AT LEAST ONE LOAD

(71) Applicant: KONINKLIJKE PHILIPS N.V., Eindhoven (NL)

(72) Inventors: Kumar Arulandu, Breda (NL); Carsten Deppe, Aachen (DE); Georg Sauerländer, Aachen (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/385,776

(22) PCT Filed: Mar. 8, 2013

(86) PCT No.: PCT/IB2013/051841
§ 371 (c)(1),
(2) Date: Sep. 17, 2014

(87) PCT Pub. No.: WO2013/150399
PCT Pub. Date: Oct. 10, 2013

(65) Prior Publication Data
US 2015/0042230 A1    Feb. 12, 2015

Related U.S. Application Data

(60) Provisional application No. 61/726,624, filed on Nov. 15, 2012, provisional application No. 61/613,121, filed on Mar. 20, 2012.

(51) Int. Cl.
*H05B 33/08*    (2006.01)

(52) U.S. Cl.
CPC .......... *H05B 33/083* (2013.01); *H05B 33/0893* (2013.01)

(58) Field of Classification Search
USPC .................................. 315/119–128
See application file for complete search history.

(56) References Cited

U.S. PATENT DOCUMENTS

| 3,890,555 | A  |   | 6/1975  | Nelson et al. |
| 2008/0315778 | A1 | * | 12/2008 | Tatsukawa ............ 315/193 |
| 2009/0290389 | A1 |   | 11/2009 | Ueno et al. |

(Continued)

FOREIGN PATENT DOCUMENTS

| EP | 2410817 A2 | 1/2012 |
| WO | 2011037774 A1 | 3/2011 |
| WO | 2011119031 A1 | 9/2011 |

*Primary Examiner* — Douglas W Owens
*Assistant Examiner* — Jonathan Cooper

(57) ABSTRACT

The invention relates to a circuit arrangement (1) for controlling at least one load (D1, D2, D3). In order to provide means for extracting an auxiliary power supply from a current source in order to control shunt switching, the inventive circuit arrangement (1) comprises an input terminal (11) for connection to a power supply (30), an output terminal (12) for connection to at least one load element (20, 21, 22, 23), a control circuit (10), comprising a control device (13), which is adapted to control at least one load element (20, 21, 22, 23), and an energy storage device (C), which is adapted to supply power to the control device (13). A controllable bypass switch (M4) is further provided, wherein said bypass switch (M4) and said control circuit (10) are connected in parallel and are connected between said input terminal (11) and said output terminal (12). The circuit arrangement (1) is adapted to operate the bypass switch (M4) to control the power provided to the control circuit.

20 Claims, 2 Drawing Sheets

(56) References Cited

U.S. PATENT DOCUMENTS

| | | |
|---|---|---|
| 2010/0134018 A1 | 6/2010 | Tziony et al. |
| 2010/0141153 A1* | 6/2010 | Recker et al. ............... 315/149 |
| 2010/0181923 A1 | 7/2010 | Hoogzaad |
| 2010/0181936 A1* | 7/2010 | Radermacher et al. ....... 315/307 |
| 2012/0025713 A1 | 2/2012 | Ribarich et al. |

* cited by examiner

CIRCUIT ARRANGEMENT FOR CONTROLLING AT LEAST ONE LOAD

CROSS-REFERENCE TO PRIOR APPLICATIONS

This application is the U.S. National Phase application under 35 U.S.C. §371 of International Application No. PCT/IB13/051841, filed on Mar. 8, 2013, which claims the benefit of U.S. Provisional Patent Application No. 61/726,624, filed on Nov. 15, 2012 and U.S. Provisional Patent Application No. 61/613,121 filed on Mar. 20, 2012. Each of these applications is hereby incorporated by reference herein.

TECHNICAL FIELD

The invention relates to a circuit arrangement for controlling at least one load, an LED lamp, a retrofit assembly for an LED lamp and a method of controlling at least one load.

BACKGROUND ART

LED-based lamps have an ever-growing importance for lighting technology. The low power consumption and long lifetime of LEDs make them a highly favorable choice for various applications. White LEDs can be employed in retrofit bulbs that can replace conventional filament bulbs. Besides, LEDs having various colors are known in the art. It is also known to combine red, green and blue LEDs to create the impression of a virtually unlimited variety of colors.

Most retrofit LED bulbs sold today have on/off control, while others are dimmer compatible with phase cut wall dimmers. New developments are aiming at adding new functions to LED lamps, like wireless control by ZigBee or WiFi. For these applications an auxiliary supply is required to power the wireless communication chip, which increases costs as well as the complexity of the power supply design.

A colour-tunable LED bulb comprises three different LEDs (red, green and blue), wherein the light output of each LED is controlled individually to create different colours. A typical LED bulb with multiple PWM (Pulse Width Modulation) channels (such as R, G and B) requires a voltage-to-current converter and an auxiliary supply voltage for the control of the individual channels. High-end colour control requires an accurate control of the LED current. This is usually realized by an accurate current level and PWM. There are various ways to realize this LED PWM current.

For example, in a power conversion stage using a fly-back converter, i.e. with a typical transformer setup, mains AC may be converted to two DC voltages, 32V and 5V. The 32V voltage is then converted into a constant current with a buck converter; the setup is therefore also referred to as "dual-stage power conversion stage". Since the constant current will be maintained even when the output voltage changes, it is possible to connect multiple LED channels in series and to control each channel by short-circuiting individual channels according to the required PWM (brightness) values.

Short-circuiting can be done by a so-called shunt topology, which is applied to control the light output. Herein, one or several LED channels connected in series may be present. Each of the LED channels comprises an LED, which is connected in parallel to a shunting switch operated to control the power consumption of the corresponding LED. In particular, the shunting switch may be a MOSFET.

For the fly-back converter of this exemplary setup, it is quite common to regulate the output voltage of the largest output power (32V of the LED circuit), derived from a main winding of the fly-back transformer. An auxiliary supply voltage (5V) is used to supply control electronics and may be derived from an auxiliary winding of the fly-back transformer. Due to the voltage equilibrium of the transformer windings and the shunt switching topology, variations of the auxiliary supply voltage may occur upon a change of the current in the main winding. Hence, if a shunt switching topology is employed, a constant voltage to supply control electronics, such as a microcontroller or the like, cannot be maintained by an auxiliary winding tapped off from the fly-back transformer.

Additionally, there is also another challenge: to have a floating supply voltage to drive the shunt switches.

Given the abovementioned problems, it is an object of the present invention to provide means for extracting an auxiliary power supply from a current source in order to control shunt switching with a cost-effective, loss-reducing setup.

DISCLOSURE OF INVENTION

The problem is solved by a circuit arrangement according to claim 1, an LED lamp according to claim 13 and a method according to claim 14.

The inventive circuit arrangement for controlling at least one load comprises an input terminal for connection to a power supply and an output terminal for connection to at least one load element. "Load" here and in the following context refers to any device that consumes power when a voltage is applied to it. The power may be transformed into light, mechanical energy, heat etc. "Load element" refers to a circuit comprising a load, in the simplest case it consists of one load. Preferably, the at least one load element comprises an LED. The term "power supply" herein refers to any kind of electrical power source, i.e. it can be a voltage source or a current source, and it may provide AC or DC voltage (or current, respectively). Preferably, the circuit arrangement is intended for connecting the input terminal to a constant current source. The abovementioned connections—and others mentioned below—may be permanent (e.g. formed by soldering) or detachable, e.g. like in a plug-and-socket system. Furthermore, it is understood that if the connection is formed by a conductor path on a printed circuit board, the corresponding terminal may not be physically discernible from the rest of the conductor path. The output terminal is adapted to provide power to the at least one load element at least when the input terminal is connected to the power supply.

The circuit arrangement further comprises a control circuit and a controllable bypass switch. The control circuit comprises a control device, which is adapted to control at least one load element, and an energy storage device, which is adapted to supply power to the control device. Control of the load element herein refers to stabilizing and/or changing its operation state, e.g. by activating or deactivating the load or changing the amount of power consumed by it. However, depending on the type of load, multiple operational parameters may be controlled.

Within the scope of the invention, closed-loop control as well as open-loop control may be employed, i.e. feedback on the state of the load element may be used or not. Preferably, the control device is adapted to control the load element such that the operating state of the load element is time-dependent. The control capability of the control device can be implemented in software or hardware. Preferably, the control device is a microcontroller. The energy storage device is capable of storing energy, preferably in an electrical and/or magnetic field. When energy is stored in the energy storing device, it is capable of at least temporarily supplying power to the control device. Therefore, it must be at least temporarily electrically connected to the control device. Usually, this connection is permanent.

The bypass switch is a device that can be switched between a low-resistance state and a high-resistance state. Here and in the following, the switch in the low-resistance state is referred to as "closed" while in the high-resistance state it is referred to as "open". Intermediate states and/or continuous switching between the two aforementioned states may be possible, but are not essential for the present invention. Examples of a bypass switch according to the invention include switching devices such as a mechanical switch, a relay, a tyristor or a transistor and in particular a MOSFET.

According to the invention, the bypass switch and the control circuit are connected in parallel and are connected between said input terminal and said output terminal. Therefore, when the bypass switch is closed, a bypass from the input terminal to the load element is provided with respect to the control circuit, while this bypass is blocked (or at least decreased) when the bypass switch is opened.

Furthermore, the circuit arrangement is adapted to operate the bypass switch to control the power provided to the control circuit. That is to say, the circuit arrangement opens and closes the bypass switch, whereby the power provided to the control circuit is controlled. Preferably, a current between the input and output terminal through the control circuit is controlled by operating the bypass switch. Preferably, the circuit arrangement is adapted to charge the energy storage device when the bypass switch is open.

The circuit arrangement is adapted for connecting the load element to the output terminal, so that the load element is connected in series with each of the bypass switch and the control circuit with respect to the input terminal. In this case, when the bypass switch is closed, the current from the input terminal through the control circuit to the output terminal is decreased (and is preferably neglible) if the resistance of the closed bypass switch is low enough. When the bypass switch is opened, the current from the input terminal through the control circuit to the output terminal is increased. The change of current through the control circuit corresponds to a change of power provided to it.

Hence, it is possible to increase the power provided to the control circuit to charge the energy storage device by opening the bypass switch. When the bypass switch is closed, less power (or no power at all) is provided to the control circuit, which may be insufficient to operate the control device. However, the control device can still be operated by the power that the energy storage device provides. When the load element (like an LED) is connected to the output terminal and the bypass switch is closed, any power supplied at the input terminal may essentially be consumed by the load element (since the switch may consume a neglible amount of power), while the control circuit, which is bypassed in this state, may essentially only consume power supplied by the energy storage device.

By means of the inventive circuit arrangement, the control device can be made independent—at least temporarily—of an "external" power supply connected to the input terminal. This is because of the energy storage device, which can maintain the power supply to the control unit even if the control circuit is bypassed. In certain embodiments that will be explained below, a (minimum) operating voltage for the control unit can be maintained by the energy storage device. On the other hand, since the energy storage device uses the power —i.e., usually, the current—supplied through the input terminal, there is no need for an additional power supply, auxiliary winding or converter for the control unit. Therefore, a single stage AC to constant current driver can be used as the power supply while the control device powers itself from the same current as the load element(s) (e.g. an LED) connected to the output terminal.

In a preferred embodiment of the invention, the circuit arrangement is adapted to open the bypass switch if a charge level of the energy storage device corresponds to a lower threshold and to close the bypass switch if said charge level corresponds to an upper threshold. In particular, the charge level may be given by a voltage level. Since the energy storage device is connected in parallel to the control device, this voltage level may be easily determined by measuring the voltage at the control device. The lower threshold will usually be chosen so that the control device is kept operable, although it is conceivable that a temporal blackout of the control device may be acceptable. Thus, when the charge level drops to or below the lower threshold, a recharge of the energy storage device is initiated by opening the bypass switch. The upper threshold will generally be chosen to be above the lower threshold. However, the two thresholds may be identical. In this case, some kind of time delay may be employed to prevent the circuit from continuously opening and closing the bypass switch.

As an alternative, the bypass switch may be opened and closed according to a predetermined time pattern. This may in particular be possible if all parameters relevant to the operation of the circuit arrangement (specifications of the power supply and the load element(s) etc.) are known and the performance can be largely predicted in advance.

Preferably, the control device is adapted to selectively control a plurality of load elements. This means that each of the plurality of load elements is controlled individually, e.g. one load element is deactivated while another load element is still active. The inventive circuit arrangement is particularly useful if the control device is adapted to selectively control LED units of a multi-color LED lamp. Herein, the term "LED unit" refers to a load element comprising at least one LED. Usually, all LEDs in one LED unit will be of the same color, but "mixing" of different colors within one LED unit is also possible. In a multi-color LED lamp, different LED units comprise LEDs having different colors (or combinations of colors). For instance, one LED unit may comprise only blue LEDs while another unit comprises red LEDs or a 50:50 combination of red and green LEDs.

It is particularly preferred that the control device is adapted to control the red, green and blue LED units of a color-tunable LED lamp. As is known in the art, a color tunable LED lamp comprises at least one red, one green and one blue LED unit, wherein the brightness of each LED unit can be controlled individually (either according to a predetermined pattern or according to a user input) so that virtually every color can be created by additive color mixing.

Although the control of the bypass switch may be handled by a separate component in the circuit arrangement, it is preferred that the control device is adapted to control the bypass switch. Thus, the control functions essential to the present invention—control of the load element and control of the bypass switch—may be arranged together in one component (e.g. a microcontroller). Moreover, in this case the control device itself determines the source of its power, namely either the power supply connected to the input terminal or the energy storage device.

Preferably, the energy storage device is at least one capacitor and said capacitor and the control device are connected in parallel with respect to the input and output terminal. In this embodiment, the capacitor can be charged to a voltage sufficient for operating the control device while the bypass switch is open. When the bypass switch is closed, the capacitor will discharge while supplying the control device with energy. Since the capacitor is connected in parallel with the control device, the voltage applied to the control device is defined by the voltage to which the capacitor is charged. This embodiment thus is very useful for maintaining a (relatively stable) operating voltage for the control unit. The capacitance of the capacitor and the length of the "discharge interval" can be chosen such that the voltage does not drop below a level necessary to operate the control device. As an alternative or in addition to a capacitor, a rechargeable or accumulator battery could be used as an energy storage device according to the invention.

Alternatively or additionally, it is conceivable that the energy storage element comprises an element having an inductance, like a coil, which is connected in series with the control device. In this case, the inductance prevents a current through the control device from instantly collapsing, thus supplying energy to the control device at least for short time intervals. Moreover, energy could be stored as kinetic energy, e.g. in a cooling fan that alternatingly works as a motor ("charge interval") and as a generator ("discharge interval").

As the energy storage device is intended to maintain a power supply for the control device when the bypass switch is closed, any additional drain on the energy storage element should be prevented. Therefore it is preferred that the circuit arrangement comprises a discharge control element, which is adapted to prevent the energy storage device from being discharged through the bypass switch. This applies in particular to the times when the bypass switch is closed. A simple way to achieve this is to provide a diode between the input terminal and the energy storage device. Thus, a charge current may flow through the diode to charge the energy storage device, but when the bypass switch is closed, no (or only a negligible) discharge current can flow through the bypass switch. Instead of a diode, more complex rectifying elements, which are known in the art, may be used. Instead of these "static" elements, it is possible to provide a second switch that is closed when the bypass switch is opened and vice versa. It is also conceivable that the bypass switch is a toggle switch that takes over both functions.

One aspect of the present invention is that it may be used in a system where the operation of the loads is influenced by some external input. In one such embodiment, the control device is adapted to receive a control signal from a sensor unit. Such a sensor unit may comprise e.g. a touch sensor, a motion sensor, a brightness sensor etc. For instance, if the load is a light source like an LED, its brightness may be controlled according to ambient brightness or it may be activated by touch or motion. It is highly preferred that if the sensor unit requires a power supply, the power is provided by the energy storage device of the circuit arrangement.

In a particularly preferred embodiment, the control device is adapted to receive a control signal from a receiver of a wireless remote control system. Such a remote control system may in particular be based on known standards such as Zigbee or Wifi. Radio or infrared signals may be used to implement remote control. If the receiver requires a power supply, it is preferred that the power is supplied by the energy storage device. Thus, wireless operability is provided without a need for an additional power supply. If two-way communication is required (e.g. to give feedback on the reception of a control signal), the control device can also be adapted to control a transmitter of the wireless control system. Herein it is also preferred that the power required for operating the transmitter is provided by the energy storage device. It is understood that a receiver and/or transmitter as well as the abovementioned sensors may also be integrated into the control device.

The circuit arrangement may further comprise at least one load element, which is connected to the output terminal. That is to say, with respect to the input terminal, the load element is connected in series with the bypass switch as well as with the control circuit. Preferably, the load element comprises a load unit and a shunting device, which are connected in parallel to each other with respect to the output terminal. "Load unit" herein has the meaning as explained above. A shunting device is a device having at least a high-resistance state and a low-resistance state. Since the shunting device is connected in parallel to the load unit, the current through the shunting device is increased and the current through the load unit is decreased if the shunting device changes to the low-resistance state. The shunting device may have intermediate states between the high-resistance and low-resistance state. The shunting device may in particular be a transistor, preferably a MOSFET. Alternatively, e.g. a tyristor, a mechanical switch, an optocoupler, a relay etc. may be employed. The circuit arrangement according to the invention may be a retrofit assembly for an LED lamp. For instance, such an assembly may be adapted to be "inserted" between an existing LED driver and an LED unit, i.e. the input terminal is connected to a corresponding terminal of the LED driver, while the LED unit is connected to the output terminal. Thus, the retrofit assembly can be used as an add-on unit in an existing lamp. Of course, the retrofit assembly itself may also include an LED unit.

In a further aspect of the present invention, an LED lamp is provided that comprises an inventive circuit arrangement as described above. Such an LED lamp comprises at least one LED unit that is connected to the output terminal of the circuit arrangement and controlled by the control device. Usually, the lamp will also comprise a power supply to convert the mains voltage into a DC current suitable for operating the LEDs.

Another aspect of the present invention finally provides a method of controlling at least one load with a circuit arrangement. The circuit arrangement comprises an input terminal for connection to a power supply, an output terminal for connection to at least one load element, a control circuit, comprising a control device and an energy storage device, and a bypass switch. Herein the bypass switch and the control unit are connected in parallel between said input terminal and said output terminal. According to the inventive method, the control device controls at least one load element, the energy storage device supplies power to the control device and the circuit arrangement operates the bypass switch to control power provided to the control circuit.

BRIEF DESCRIPTION OF THE DRAWINGS

These and other aspects, features and advantages of the present invention will be apparent from and elucidated with reference to the description of preferred embodiments in conjunction with the enclosed figures, in which.

DESCRIPTION OF EMBODIMENTS

Figure 1:
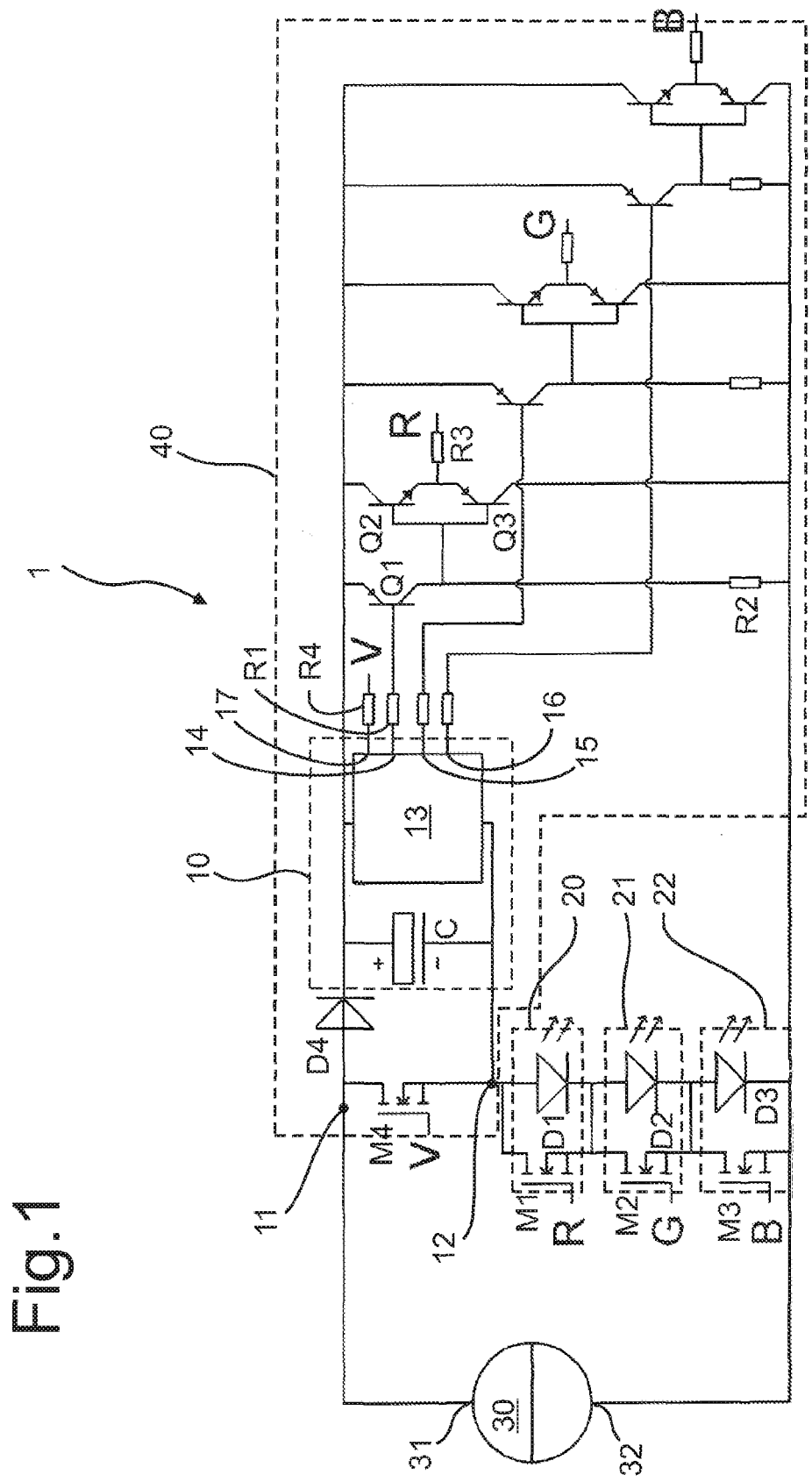
FIG. 1 shows an embodiment of a circuit arrangement according to the present invention.

FIG. 1 shows a circuit arrangement 1 according to the present invention. The circuit arrangement 1 comprises a control circuit 10, which comprises a capacitor C as an energy storage device and a microcontroller 13 as a control unit. The control circuit 10 is connected in parallel to a bypass MOSFET M4. Both the control circuit 10 and the bypass MOSFET M4 are connected between an input terminal 11 and an output terminal 12. The input terminal 11 is connected to a positive terminal 31 of a constant current source 30, which is provided by an LED driver (not shown). A charge control diode D4 is connected between the capacitor C and the input terminal 11.

The output terminal 12 is connected to the first of three load elements 20, 21, 22 which are connected in series. Each load element 20, 21, 22 comprises an LED D1, D2, D3 for one of the colors red, green and blue. Since the configuration of each load element 20, 21, 22 is identical, only the first load element 20 will be described in detail. Herein, a first LED D1 is connected in parallel to a first MOSFET M1 which serves as a shunting switch. The constant current supplied by the LED driver is divided between the first LED D1 and the first MOSFET M1, wherein the power consumption of the first LED D1 will decrease if the current through the first MOSFET M1 increases.

The first MOSFET M1 is operated by the microcontroller 13 by means of a first operating terminal 14. The first operating terminal 14 is connected to the base of a first transistor Q1, which is of the PNP type, through a first resistor R1. The emitter of the first transistor Q1 is connected to the charge control diode D4, while its collector is connected through a second resistor R2 to a negative terminal 32 of the constant current source 30 and to the base of a second transistor Q2, which is of the NPN type, and the base of a third transistor Q3, which is of the PNP type. The emitter of the second transistor Q2 is connected to the charge control diode D4 while its collector is connected to the emitter of the third transistor Q3. The collector of the third transistor Q3 is connected to the negative terminal 32.

The collector of the second transistor Q2 (and the emitter of the third transistor Q3) are connected to the gate of the first MOSFET M1 through a third resistor R3. The microcontroller 13 also comprises a second and third operating terminal 15, 16 for operating the second and third MOSFET M2, M3, respectively. The second and third operating terminals 15, 16 are connected to a set of resistors and transistors in a manner corresponding to the first operating terminal.

Further, the microcontroller 13 comprises a bypass operating terminal 17 which is connected to the gate of the bypass MOSFET M4 through a fourth resistor R4. The microcontroller 13 also detects the voltage at the capacitor C and compares it to a lower threshold and an upper threshold, using an internal comparator circuit (not shown).

During operation, the current source 30 provides a constant current to the positive terminal 31. At initial power-up, the bypass MOSFET M4 is switched off. Hence, the constant current passes through the microcontroller 13 and charges the capacitor C. The capacitor C is charged until the upper threshold is reached. At this point, the microcontroller 13 switches the bypass MOSFET M4 on. Now, the current of the current source 30 will pass through the bypass MOSFET M4 directly to the LEDs D2, D2, D3 and/or shunt switches M1, M2, M3. In this state no (or negligible) current from current source 30 flows into the control circuit 10. Therefore, the microcontroller 13 is now supplied by the capacitor C, which causes the voltage of the capacitor C to drop. Once the lower threshold voltage of the capacitor C is reached, the microcontroller 13 switches the bypass MOSFET M4 off and the charging process is initiated again. By placing the supply on top of the LEDs D1, D2, D3, the gate drive voltage is sufficient to switch the bypass MOSFET M4. This floating/high-side supply also supports shunt switching as the gate drive is always higher than the highest LED forward voltage.

The microcontroller in addition controls the light output of the first, second and third LED D1, D2, D3 by operating the corresponding MOSFET M1, M2, M3. By way of an example, operation of the first MOSFET M1 is described in the following.

When the microcontroller 13 sets the voltage at the first operating terminal 14 to a low value, current starts to flow from the emitter of the first transistor Q1 through its base via the first resistor R1 towards the microcontroller 13. The first transistor Q1 is switched on and the voltage on its collector starts to increase. When the collector voltage of the first transistor Q1 is sufficient, it starts providing current to the base of the second transistor Q2, which, in turn, will start switching on. The emitter voltage of the second transistor Q2 rises towards its collector voltage. During this time, the gate voltage of the first MOSFET M1 starts to increase and eventually the first MOSFET M1 switches on.

To switch the first MOSFET M1 off, the voltage at the first operating terminal 14 is set high. The base-emitter voltage of the first transistor Q1 drops and causes the first transistor Q1 to switch off. Once the first transistor Q1 is switched off, the second resistor R2 will pull down the base voltage of the second and third transistor Q2, Q3. The second transistor Q2 will close and the third transistor Q3 will start conducting. The gate of the first MOSFET M1 will then be discharged via the third resistor R3 and the third transistor Q3 (and, to a very small degree, through the base of the third transistor Q3 and the second resistor R2). The MOSFET M1 will be switched off.

The control may follow a predetermined time pattern. However, the microcontroller 13 could also be part of a ZigBee network device. In this case, a user can use a ZigBee compatible remote control (not shown) to select a certain RGB colour. The remote control sends a corresponding command to the microcontroller 13, which in turn operates the MOSFETs M1, M2, M3 accordingly. The entire ZigBee network device could be supplied in the same way as the microcontroller 13, i.e. by the constant current source 30 and the capacitor C. Hence, it is possible to integrate ZigBee functionality into an LED lamp without the need for an additional power supply. As mentioned before, other functionalities instead of ZigBee could also be added, e.g. WiFi, or the microcontroller 13 could be connected to a motion sensor, a touch sensor or the like. In each of these applications, no additional power supply is needed for the additional functionality.

The circuit arrangement shown in FIG. 1 could be divided up into the current source, the load (consisting of the load elements) and a supply & control circuit 40 (see FIG. 1). The latter could be employed as a retrofit assembly for existing luminaries. Thereby new control features and functionalities could be added without the need for exchanging the whole lamp. The advantage is that an auxiliary supply is not required and all wiring adjustments could be done on the low voltage side of the LED driver 30, thereby making the modifications harmless from the safety point of view.

Figure 2:
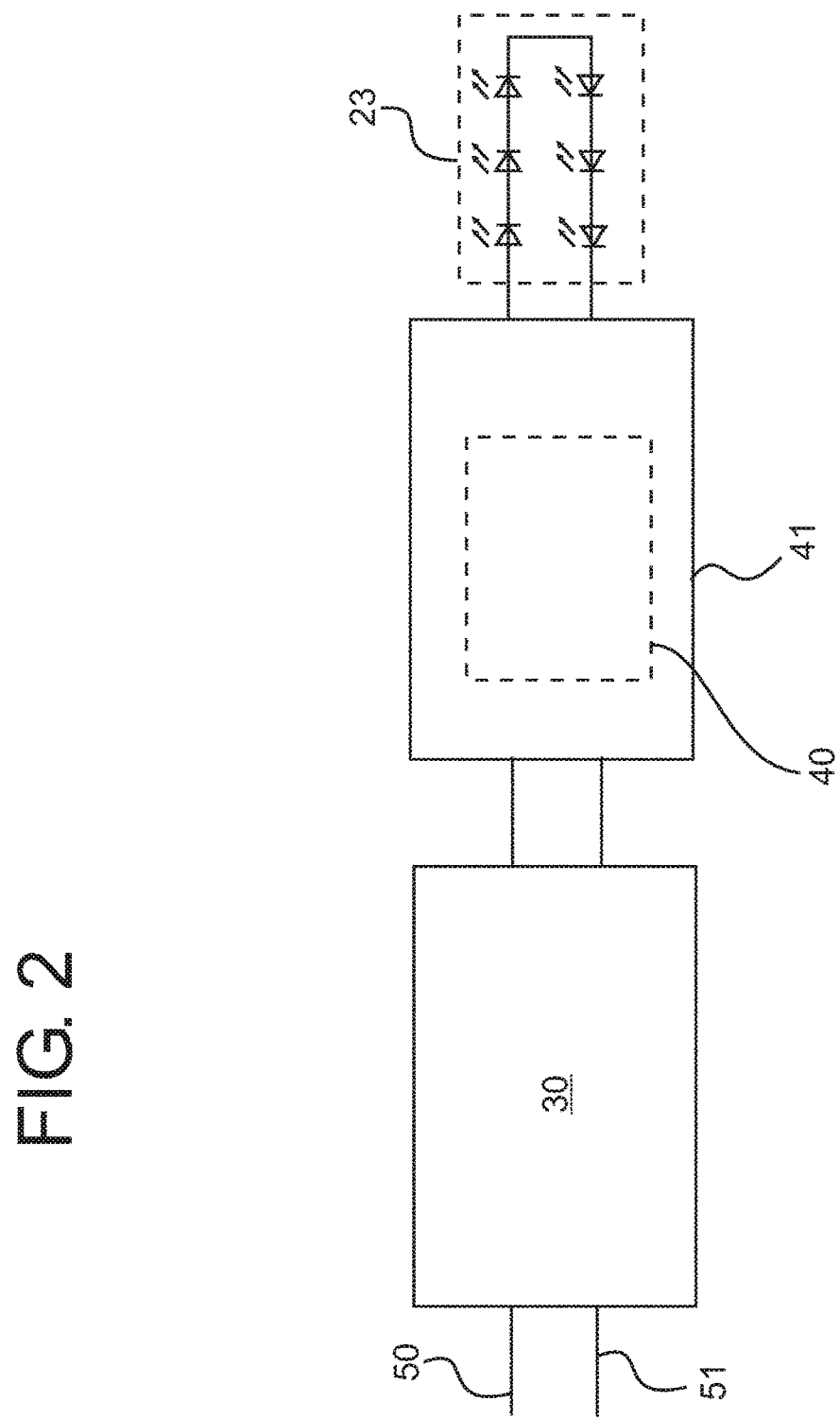
FIG. 2 is a schematic view of components of an exemplary LED lamp.

FIG. 2 shows an example of how the supply & control circuit 40 could be used as an add-on unit at system level. Shown are components of an LED lamp. An LED driver 30 is connected to a live wire 50 and a neutral wire 51 of a mains supply. The supply & control circuit 40 as part of a retrofit assembly 41 can be connected to the low voltage side of the LED driver 30. Any of the abovementioned new features (ZigBee or WiFi functionality, etc.) are integrated in the retrofit assembly 41. The supply & control circuit 40 is in turn connected to a load 23 (for sake of simplicity, only the LEDs are shown without the corresponding shunting switches), which is controlled by the control unit 10 integrated in the supply & control part 40. As shown in FIG. 2, the inventive circuit arrangement 1 can be used as a building block to add control features to a luminaire which employs any commodity LED driver 30 that allows shunt switching. This results in fewer components in stock and ease of adding new functionalities to existing luminaires.

Other variations to the disclosed embodiments can be understood and effected by those skilled in the art practicing the claimed invention from the drawings, the disclosure and the appended claims.

In the foregoing description and in the appended claims, a reference to the singular is also intended to encompass the plural and vice versa and reference to a specific number of features or devices is not to be construed as limiting the invention to the specific numbers of features or devices. Moreover, expressions such as "include" or "comprise" do not exclude other elements and the indefinite article "a" or "an" does not exclude a plurality.

The mere fact that certain measures are recited in mutually different dependent claims does not indicate that a combination of these measures cannot be used to advantage. Any reference signs in the claims should not be construed as limiting the scope of the claims.

The invention claimed is:

1. A device, comprising:
    an input terminal for connection to a first terminal of a power supply;
    an output terminal for supplying current to a load circuit comprising a load, the load circuit being connected between the output terminal of the device and a second terminal of the power supply;
    a bypass switch connected between the input terminal of the device and the output terminal of the device; and
    a control circuit connected in parallel with the bypass switch, between the input terminal of the device and the output terminal of the device, the control circuit comprising:
        a controller, which is adapted to control the load circuit, and
        an energy storage device, which is adapted to receive power from the power supply and to supply the power to the controller,
    wherein the device is configured to operate the bypass switch to selectively provide the power from the power supply to the energy storage device, and to selectively supply current from the output terminal of the device through the bypass switch to the load circuit.

2. The device of claim 1, wherein the device is configured to open the bypass switch when a change level of the energy storage device is less than or equal to a lower threshold, and to close the bypass switch when the charge level is greater than or equal to and upper threshold.

3. The device of claim 1, wherein the controller is adapted to control the bypass switch.

4. The device of claim 3, wherein the load circuit comprises a plurality of load elements, each load element including a light emitting diode (LED), and wherein the controller is configured to selectively control the LEDs.

5. The device of claim 4, wherein the LEDs comprise a multi-color LED lamp, and wherein the controller is adapted to selectively control the LEDs of the multi-color LED lamp.

6. The device of claim 5, wherein the multi-color LED lamp is a color-tunable LED lamp including red, green and blue LEDs, and wherein the controller is adapted to control the red, green and blue LEDs of the color-tunable LED lamp.

7. The device of claim 1, wherein the energy storage device is a capacitor and said capacitor and the controller are connected in parallel with each other between the input terminal of the device and the output terminal of the device.

8. The device of claim 7, further comprising a discharge control element, adapted to prevent the energy storage device from being discharged through the bypass switch.

9. The device of claim 4, wherein the controller is adapted to receive a control signal from a sensor unit, and to selectively control the LEDs in response to the control signal.

10. The device of claim 4, wherein the controller is adapted to receive a control signal from a receiver of a wireless remote control system, and to selectively control the LEDs in response to the control signal.

11. The device of claim 1, further comprising the load circuit.

12. The device of claim 11, wherein the load circuit comprises a plurality of load elements connected in series with each other, wherein each load elements comprises:
    a load unit; and
    a shunting device connected in parallel with the load unit.

13. The device of claim 1, further comprising the load circuit, wherein the load circuit comprises a plurality of load elements, each load element including a light emitting diode (LED), and wherein the controller is configured to selectively control the LEDs.

14. A method of controlling a load circuit, the method comprising:
    connecting the load circuit between an output terminal of a device for controlling the load circuit and a second terminal of a power supply, wherein the device for controlling the load circuit includes:
        an input terminal connected to a first terminal of the power supply,
        the output terminal,
        a bypass switch connected between the input terminal of the device and the output terminal of the device in a series path with the load circuit between the first terminal of the power supply and the second terminal of the power supply in a series path with the load circuit between the first terminal of the power supply and the second terminal of the power supply, and
        a control circuit connected in parallel with the bypass switch, between the input terminal of the device and the output terminal of the device, the control circuit comprising
            a controller, and
            an energy storage device; and
    operating the bypass switch to selectively provide power from the power supply to the control circuit and to selectively supply current from the output terminal of the device through the bypass switch to the load circuit,
    wherein the energy storage device receives the power from the power supply and supplies the power to the controller.

15. The device of claim 4, wherein the controller includes a plurality of operating terminals for supplying control signals for controlling the LEDs.

16. The method of claim 14, wherein the load circuit comprises a plurality of load elements, each load element including a light emitting diode (LED), the method further comprising selectively controlling the LEDs.

17. The method of claim 16, wherein the LEDs comprise a multi-color LED lamp, the method further comprising selectively controlling the LEDs of the multi-color LED lamp.

18. The method of claim 17, wherein the multi-color LED lamp is a color-tunable LED lamp including red, green and blue LEDs, the method further comprising controlling the red, green and blue LEDs of the color-tunable LED lamp to tune a color of light output therefrom.

19. The method of claim 16, further comprising:
the controller receiving a control signal from a sensor unit; and
the controller selectively controlling the LEDs in response to the control signal.

20. The method of claim 16, further comprising:
the controller receiving a control signal from a receiver of a wireless remote control system; and
the control unit selectively controlling the LEDs in response to the control signal.

* * * * *